United States Patent [19]
Tomforde

[11] Patent Number: 4,778,212
[45] Date of Patent: Oct. 18, 1988

[54] MOTOR VEHICLE FRONT BUMPER MOLDING WITH AIR SPOILER

[75] Inventor: Johann Tomforde, Sindelfingen, Fed. Rep. of Germany

[73] Assignee: Daimler-Benz Aktiengesellschaft, Stuttgart, Fed. Rep. of Germany

[21] Appl. No.: 39,229

[22] Filed: Apr. 17, 1987

[30] Foreign Application Priority Data

Apr. 19, 1986 [DE] Fed. Rep. of Germany ....... 3613302

[51] Int. Cl.$^4$ ...................... B62D 25/08; B62D 37/02
[52] U.S. Cl. ................. 296/180.1; 293/117; 180/903
[58] Field of Search .......................... 296/1 S; 293/117

[56] References Cited
U.S. PATENT DOCUMENTS

| 4,379,582 | 4/1983 | Miwa | 296/1 S |
| 4,398,764 | 8/1983 | Okuyama | 296/1 S |
| 4,401,339 | 8/1983 | Rios | 296/1 S |
| 4,558,897 | 12/1985 | Okuyama | 296/1 S |

FOREIGN PATENT DOCUMENTS

| 2851639 | 6/1980 | Fed. Rep. of Germany . | |
| 2927036 | 1/1981 | Fed. Rep. of Germany . | |
| 3003568 | 8/1981 | Fed. Rep. of Germany . | |
| 3145258 | 5/1983 | Fed. Rep. of Germany | 296/1 S |
| 2575126 | 6/1986 | France | 296/1 S |
| 0040916 | 4/1978 | Japan | 296/1 S |

Primary Examiner—Robert B. Reeves
Assistant Examiner—Russell D. Stormer
Attorney, Agent, or Firm—Barnes & Thornburg

[57] ABSTRACT

The application relates to a front bumper moulding for motor vehicles with an integrated bumper wherein lateral portions of the front bumper moulding are designed so that they can be swung out or extended from a retracted to an extended position, thus providing an unchanged appearance at a retracted position when the vehicle is stopped and at low driving speeds and an especially favorable flow behavior at high vehicle driving speeds, and wherein lateral portion of the front bumper moulding are located in front of the vehicle front wheels and are designed as moveable air spoiler elements.

7 Claims, 2 Drawing Sheets

MOTOR VEHICLE FRONT BUMPER MOLDING WITH AIR SPOILER

BACKGROUND AND SUMMARY OF THE INVENTION

The invention relates to the providing of air spoiler means on a front moulding on motor vehicles with an integrated bumper, wherein portions of the front bumper moulding are designed so that these portions can be swung out or extended to act as air spoilers.

German Offenlegungsschrift No. 3,003,568 discloses a front moulding for motor vehicles, in which a middle portion is designed so that it can be pivoted forward in order provide special protection for pedestrians.

In contrast to this showing, the present invention develops a front moulding s that under specific driving conditions, its configuration can be changed so as to improve the driving properties of a vehicle equipped with it.

More particularly, a front moulding of a motor vehicle according to the instant invention, has lateral portions located ahead of the front vehicle wheels and designed as moveable air spoiler elements.

The air spoilers of the instant invention acting in conjunction with a central lowered underfloor moulding surface of the vehicle provide a most efficient air flow behavior on the underside of the vehicle.

Advantageously, a particularly inconspicuous appearance can be obtained if by having the movable spoiler elements surrounded laterally on the outside by fixed parts of the front moulding.

The invention provides for either pivoting of the spoilers about a transverse axis of the vehicle from a retracted to an extended position or obliquely guiding the spoilers in downwardly and outwardly extending guides to their extended position.

In the retracted position the spoilers blend in to the front bumper moulding so as to be relatively unnoticeable.

These and other objects, features, and advantages of the present invention will become more apparent from the following description when taken in connection with the accompanying drawings which show, for the purposes of illustration only, plural embodiments in accordance with the present invention, and wherein:

DETAILED DESCRIPTION OF THE DRAWINGS

Figure 1:
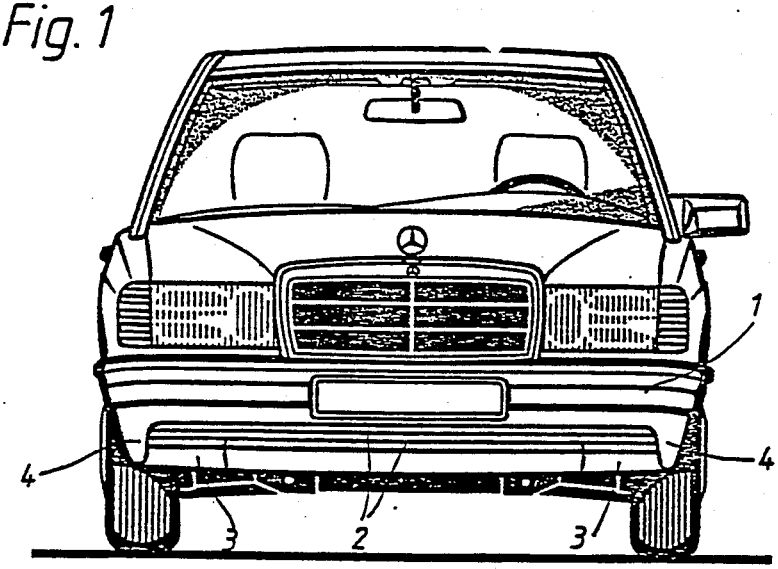
FIG. 1 shows a front view of a passenger car with the spoiler elements retracted.
Figure 2:
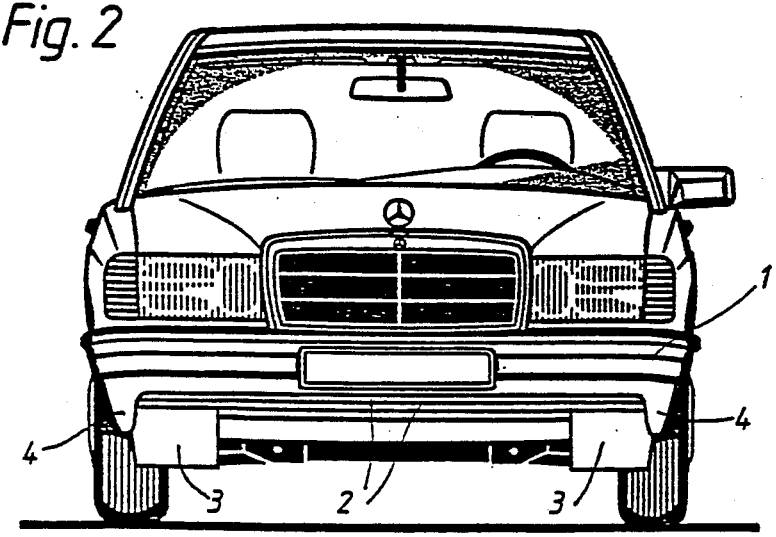
FIG. 2 shows an illustration corresponding to that of FIG. 1, with the spoiler elements extended.

The passenger car shown in FIGS. 1 and 2 of the drawings has a front bumper moulding 1 with an integrated bumper and air guide slits 2. Arranged in the right and left lateral regions of the front mounding 2 are movable spoiler element portions 3 of the front bumper, which can be retracted and extended as a function of the driving speed. In addition to the control dependent on the driving speed, an overriding manual control can also be provided. Not only are the moveable spoiler elements moveable in response to the vehicle speed, but the extent of their movement can be made proportional to the vehicle speed. The particular mechanism for controlling movement can be a lever or linkage system of any well known construction to one skilled in the art and can use any one of an electrical, mechanical or servo-fluid actuated device. The particular details of the structure of this control means do not form a part of this invention. Suffice it to say that the control should provide a speed input to initiate movement in proportion to vehicle speed as well as control the amount of movement in response to speed. Likewise a manual override control for the speed control means should be provided. Alternatively the speed control could be eliminated and the driver of the vehicle could mnually control the position of the spoiler in response to vehicle speed as seen in the vehicle speedometer. Laterally on the outside, the moveable spoiler elements 3 are surrounded by fixed jaw-shaped portions 4 of the front moulding 1, thus producing a harmonious overall appearance of a vehicle equipped in this way. The spoiler elements 3 can each be pivotable about a transverse axis of the vehicle and actuable selectively, for example hydraulically, by means of a vacuum or by a electrical drive.

Figure 3:
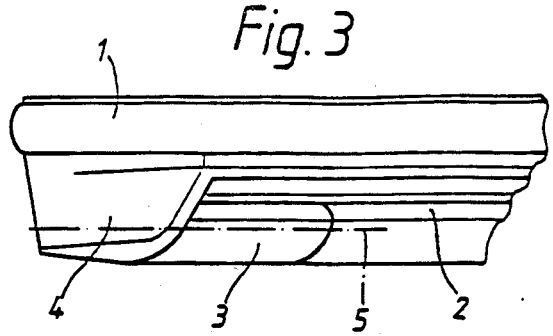
FIG. 3 shows a partial view of a front bumper moulding with the spoiler elements retracted.
Figure 4:
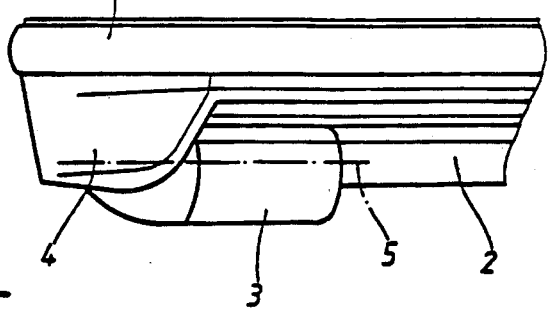
FIG. 4, shows an illustration corresponding to that of FIG. 3, but with the spoiler element pivoted out to its extended position.

The spoiler portions of the front bumper is shown on a larger scale in cut-out form in FIGS. 3 and 4. Here, the pivot axis 5 of the spoiler elements 3 is also indicated.

Figure 5:
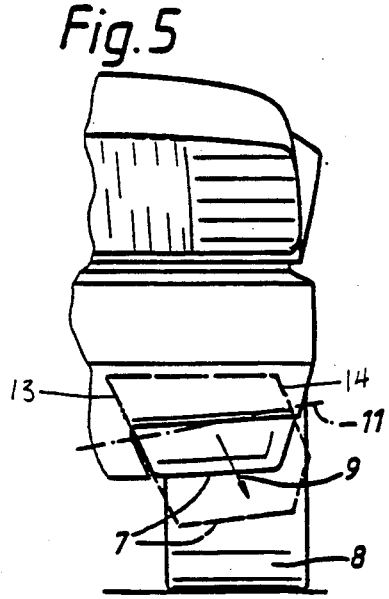
FIG. 5 shows a front view of a partial region of the front of the vehicle, with a spoiler element extendable obliquely downwards and outwards.
Figure 6:
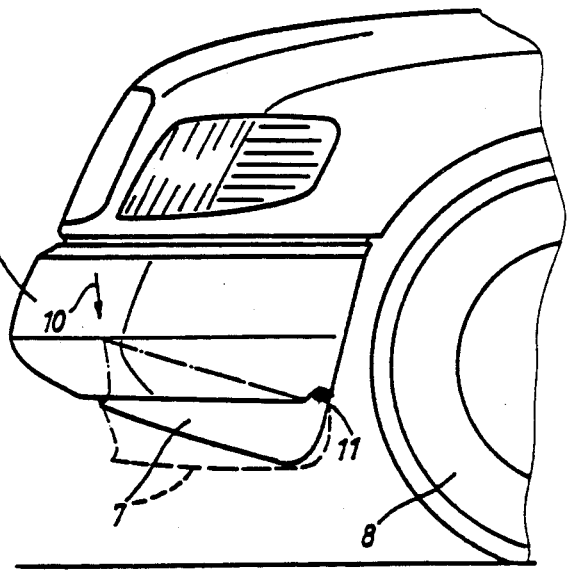
FIG. 6 shows a side view of the illustration according to FIG. 5.

FIGS. 5 and 6 of the drawing show a modified embodiment of the invention. Here again, moveable lateral spoiler elements 7 are incorporated in a front bumper moulding 6. However, so that the region in front of the front wheels 8 can be masked in an especially effective way, here the spoiler elements 7 are designed so that they can be extended obliquely downwards and outwards in the direction of the arrows 9 and 10 along guide means 13 and 14 shown schematically. At the same time, the spoiler elements 7 pivot about an axis 11 lying obliquely in space, for example by means of a working cylinder (not shown) which engages in the front region.

The retracted position of each of the spoiler elements 7 is represented by unbroken lines and the extended position by broken lines.

It should also be pointed out that, in all the embodiments of the invention, the spoiler elements can of course, also be extended or swung out into any intermediate positions.

The spoiler elements according to the invention can effectively prevent air vortices from forming in front of the front wheels, that air guidance for oil coolers and brakes can be made as efficient as possible to meet the particular road conditions, and that the arrangement of the spoiler itself into the front bumper moulding merges harmoniously into the overall appearance of the bumper moulding and does not have an aggressive appearance or effect on other road users, as is often the case with fixed spoilers.

What is claimed is:

1. A front bumper moulding means for a motor vehicle having lateral portions that can be moved from a retracted to an extended bumper position for air spoiling purposes wherein said lateral portions of said front bumper moulding means are located in front of the vehicle front wheels and means to move the lateral portions to act as an air spoiler means for the motor vehicle.

2. A front bumper moulding means according to claim 1, wherein the moveable lateral portions have outside edges and are surrounded laterally on their outside edges by fixed parts of the front bumper moulding means.

3. A front bumper moulding means according to claim 1, wherein the moveable lateral portions are pivotable about an axis transverse to the vehicle for providing the movement from the retracted position and wherein the pivot axis is located in a region of the lateral portions away from the front bumper and fowards the rear of the vehicle.

4. A front bumper moulding means according to claim 1, wherein the moveable lateral portions are moveable in guide means from the retracted to the extended position.

5. A front bumper moulding means according to claim 4, wherein the guide means extend obliquely downwards and outwards to direct the lateral portions downward and outward during movement from the retracted to the extended position.

6. A front bumper moulding means according to claim 1, wherein the means to move the lateral portions is responsive to the speed of the motor vehicle.

7. A front bumper moulding means according to claim 1, wherein the means to move the lateral portions extends the lateral portions to a position dependent on the speed of the motor vehicle.

* * * * *